United States Patent
Yamaoka et al.

(10) Patent No.: US 6,784,954 B2
(45) Date of Patent: Aug. 31, 2004

(54) LAMINATED OPTICAL DEVICE AND LIQUID-CRYSTAL DISPLAY APPARATUS

(75) Inventors: Takashi Yamaoka, Ibaraki (JP); Hiroyuki Yoshimi, Ibaraki (JP); Yuuichi Nishikouji, Ibaraki (JP); Tomoaki Masuda, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/044,961

(22) Filed: Jan. 15, 2002

(65) Prior Publication Data

US 2003/0164905 A1 Sep. 4, 2003

(51) Int. Cl.[7] ............................................. G02F 1/1333
(52) U.S. Cl. ..................... 349/96; 349/117; 359/63; 359/93
(58) Field of Search ...................... 349/96, 117, 76, 349/181; 359/63, 92

(56) References Cited

U.S. PATENT DOCUMENTS

| | | | |
|---|---|---|---|
| 4,229,498 A | * 10/1980 | Suzuki et al. | ............. 428/212 |
| 5,568,290 A | * 10/1996 | Nakamura | ................. 349/96 |
| 6,049,428 A | * 4/2000 | Khan et al. | ................ 359/491 |
| 6,174,394 B1 | * 1/2001 | Gvon et al. | ................ 156/100 |
| 6,342,934 B1 | * 1/2002 | Kameyama et al. | ........ 349/98 |

FOREIGN PATENT DOCUMENTS

| | | |
|---|---|---|
| JP | 5-27118 | 2/1993 |
| JP | 5-100114 | 4/1993 |
| JP | 8-511109 | 11/1996 |
| JP | 9-189811 | 7/1997 |
| JP | 11-231130 | * 8/1999 |
| WO | WO 94/28073 A1 | 12/1994 |

OTHER PUBLICATIONS

Pub. No. US 2002/0140882 A1, Oct. 3, 2002, Kitagawa et al.*
Patent Abstract of Japan, 05–027118, Feb. 5, 1993.
Patent Abstract of Japan, 05–100104, Apr. 23, 1993.
Patent Abstract of Japan, 09–189811, Jul. 22, 1997.

* cited by examiner

*Primary Examiner*—Robert H. Kim
*Assistant Examiner*—Thoi V. Duong
(74) *Attorney, Agent, or Firm*—Westerman, Hattori, Daniels & Adrian, LLP

(57) ABSTRACT

A laminated optical device is a laminate formed of a polarizing layer having a thickness of not larger than 5 μm, and at least one birefringent layer including either a solid film of oriented liquid crystal or a polymer layer containing oriented liquid crystal. A liquid-crystal display apparatus includes a liquid-crystal display panel, and at least one laminated optical device defined above and disposed on one of opposite surfaces of the liquid-crystal display panel.

14 Claims, 1 Drawing Sheet

LAMINATED OPTICAL DEVICE AND LIQUID-CRYSTAL DISPLAY APPARATUS

The present application is based on Japanese Patent Application No. 2000-157713, which is incorporated herein by reference.

BACKGROUND OF THE INVENTION

1. Field of the Invention

The present invention relates to a laminated optical device which can control optical properties such as polarization, phase, scatter, and reflection, and which is excellent in reduction in thickness and weight, and a liquid-crystal display device using the laminated optical device.

2. Description of the Related Art

There has been heretofore used a method in which optical members such as a polarizer, a retardation compensating birefringent plate, and a luminance-enhancing film for use in assembling of a liquid-crystal display apparatus or the like are formed separately so that these optical members can be laminated to produce the liquid-crystal display apparatus or the like as occasion demands. Incidentally, the birefringent plate is provided for improving display quality by optically compensating for the birefringent anisotropy of liquid crystal. In liquid crystal in a twisted nematic mode, or a vertical or horizontal alignment mode, the birefringent plate is used for widening the viewing angle. In this case, a plurality of birefringent plates are often used for liquid crystal in a reflection type twisted nematic mode to improve display quality.

In the method of laminating optical members formed separately, there was, however, a problem that increase in thickness and volume was inevitable because interposition of an adhesive layer such as an adhesive layer was required for the lamination. Incidentally, there have been proposed a laminate of a plurality of birefringent plates and a polarizer (Japanese Patent Publication No. 5-27118 and Japanese Patent Publication No. 5-100114), a laminate of a luminance-enhancing film, a quarter-wave plate and a polarizer (Japanese Patent Publication No. 9-189811), and a laminate obtained by bonding and laminating optical members (WV film made by Fiji Photo Film Co., Ltd. and DBEF made by 3M Company) obtained by providing obliquely oriented liquid-crystal polymer layers on the laminates as listed above.

In the laminate, however, the thickness of each of optical members such as a polarizer and a birefringent plate is generally in a range of from 20 to 300 $\mu$m. For this reason, in some case, the total thickness of the laminate exceeds 700 $\mu$m. Hence, there was a problem that the liquid-crystal display apparatus became remarkably bulky. In addition, there was a disadvantage that weight was increased too much and increase in size of the liquid-crystal display screen was difficult to be achieved.

SUMMARY OF THE INVENTION

An object of the present invention is to develop a laminated optical device which has a plurality of optical functions such as a polarizing function and an optically compensating function and which is excellent in reduction in thickness and weight.

The Invention provides a laminated optical device formed of a laminate having a polarizing layer having a thickness of not larger than 5 $\mu$m, and at least one birefringent layer including either a solid film of oriented liquid crystal or a polymer layer containing oriented liquid crystal. Accordingly, the invention provides a liquid-crystal display apparatus having: a liquid-crystal display panel; and at least one laminated optical device defined above and disposed on one of opposite surfaces of the liquid-crystal display panel.

According to the invention, a birefringent layer made of oriented liquid crystal can be formed on a polarizing layer through an oriented film in accordance with necessity so that the birefringent layer is superposed closely on the polarizing layer. Thus, a laminated optical device can be obtained. The polarizing layer is excellent in reduction in thickness so that the laminated optical device is excellent in reduction in thickness and weight as a whole. The laminated optical device exhibits a plurality of optical functions such as a polarizing function based on the polarizing layer, and an optically compensating function and/or a luminance enhancing function based on the birefringent layer.

Features and advantages of the invention will be evident from the following detailed description of the preferred embodiments described in conjunction with attached drawings.

DETAILED DESCRIPTION OF THE PREFERRED EMBODIMENTS

Figure 1:
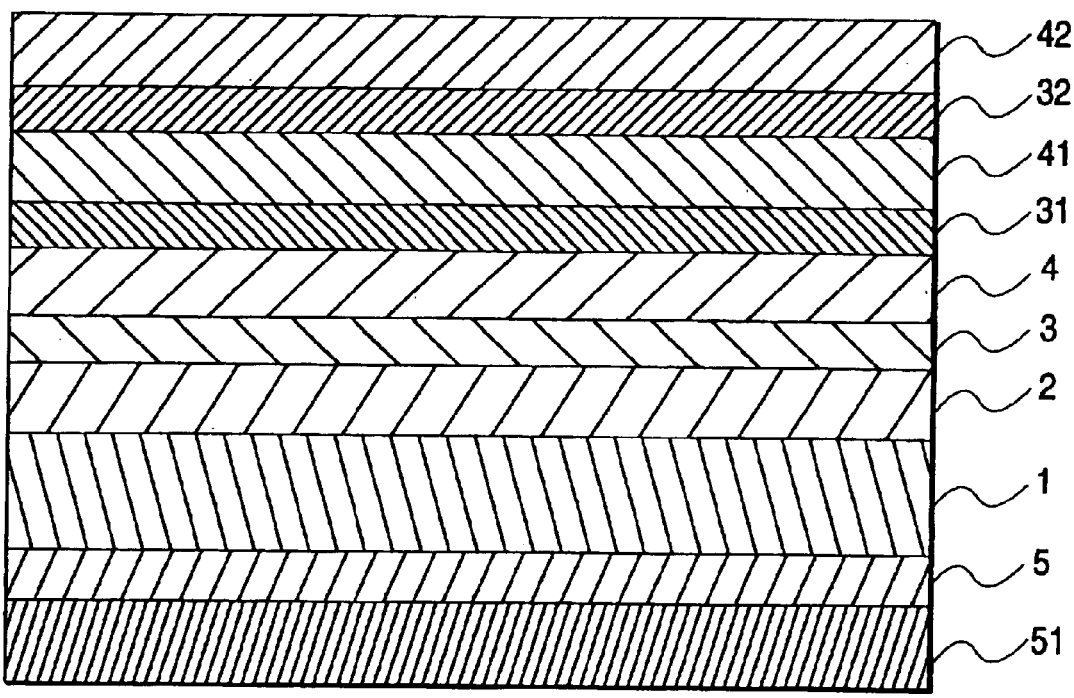
FIG. 1 is a sectional view showing an embodiment of the present invention.

A laminated optical device according to the invention is formed of a laminate comprising a polarizing layer and at least one birefringent layer. The polarizing layer has a thickness of not larger than 5 $\mu$m. The birefringent layer is constituted either by a solid film of oriented liquid crystal or by a polymer layer containing oriented liquid crystal. FIG. 1 shows an example of the laminated optical device. In FIG. 1, the reference numeral 2 designates a polarizing layer; 4, 41 and 42, birefringent layers; and 3, 31 and 32, oriented films provided as occasion demands. The reference numerals 1, 5 and 51 designate a support film, an adhesive layer and a separator respectively provided as occasion demands.

The polarizing layer is provided for giving a polarizing function to the laminated optical device. In the invention, the thickness of the polarizing layer is set to be not larger than 5 $\mu$m for the purpose of reduction in thickness. The polarizing layer having such a small thickness can be formed by a suitable coating method such as a casting method or a spin coating method. From the point of view of reduction in thickness of the laminated optical device and in consideration of polarizing characteristic and durability, it is preferable that the thickness of the polarizing layer is in a range of from 0.1 to 4 $\mu$m, especially in a range of from 0.2 to 3 $\mu$m.

A suitable material can be used for forming the polarizing layer without any particular limitation. Especially, a lyotropic liquid-crystal dichromatic dye, a dichromatic dye-containing liquid-crystal polymer, a dichromatic dye-containing lyotropic substance, or the like, may be used preferably from the point of view of efficiently forming a polarizing layer excellent in thickness, and heat resistance by the coating method.

Incidentally, a water-soluble organic dye, for example, represented by the formula: (chromogen) (SO$_3$M), can be used as the lyotropic liquid-crystal dichromatic dye. In the water-soluble organic dye, chromogen is made of an azo or polycyclic compound or the like and gives mesomorphism whereas sulfonic acid or its salt gives water-solubility. Thus, the water-soluble organic dye exhibits lyotropic mesomorphism as a whole (Japanese Patent Publication No. Hei. 8-511109). Specific examples of the dichromatic dye include compounds represented by the following formulae (1) to (7). Products such as LC polarizer (tradename, made by Optiva Corp.) are available on the market.

(1):

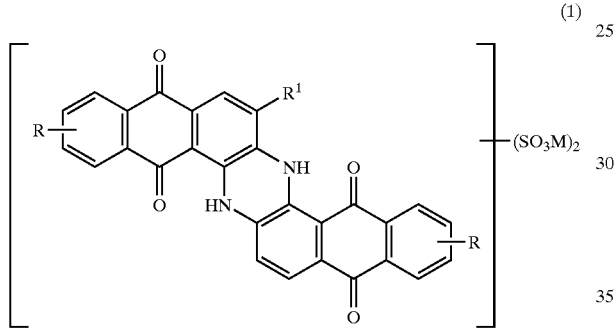

In the formula (1), R1 is hydrogen or chlorine, and R is hydrogen, alkyl radical, ArNH or ArCONH. The alkyl radical preferably has 1 to 4 carbon atoms. Especially, methyl radial or ethyl radical is preferably used as the alkyl radial. Substituted or non-substituted phenyl radical is preferably used as the aryl radical (Ar). Especially, phenyl radical having the fourth position replaced by chlorine is preferably used as the aryl radical (Ar). Further, M is cation. Hydrogen ion, ion of Group I metal such as Li, Na, K or Cs, ammonium ion or the like is preferably used as the cation (this rule applies hereunder).

(2):

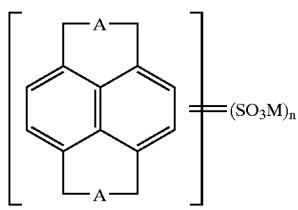

(3):

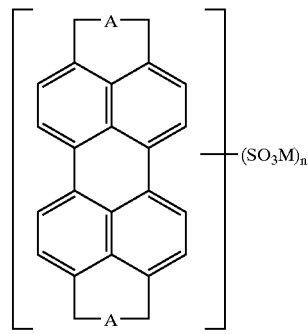

(4):

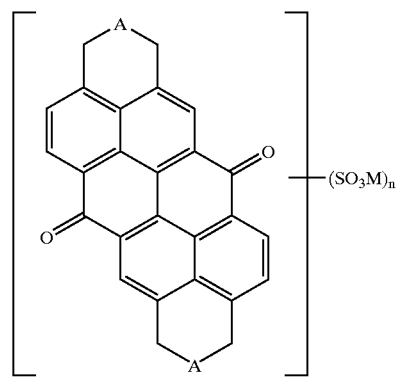

A:

a)
b)

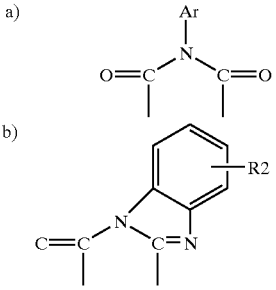

In the formulae (2) to (4), A is represented by the formula (a) or (b) in which R2 is hydrogen, alkyl radical, halogen or alkoxy radical, Ar is substituted or non-substituted aryl radial, and n is equal to 2 or 3. The alkyl radial preferably has 1 to 4 carbon atoms. Especially, methyl radical or ethyl radical is preferably used as the alkyl radical. Bromine or chlorine is preferably used as the halogen. The alkoxy radical preferably has 1 or 2 carbon atoms. Especially, methoxy radical is preferably used as the alkoxy radical. Substituted or non-substituted phenyl radical is preferably used as the aryl radical. Especially, non-substituted phenyl radical or phenyl radical having the fourth position replaced by methoxy radical, ethoxy radical, chlorine or butyl radical and the third position replaced by methyl radical is preferably used as the aryl radical.

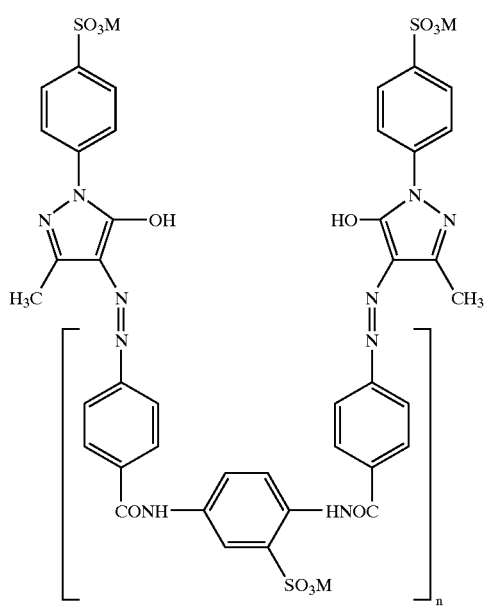

(5)

In the formula (5), n is preferably an integer of from 3 to 5.

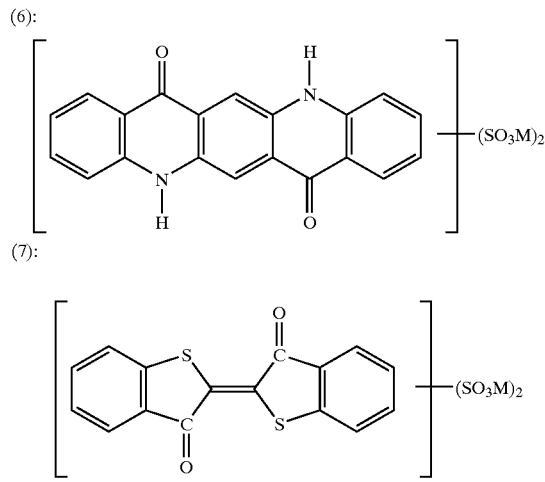

(6)

(7)

The organic dye represented by the formula: (chromogen)(SO$_3$M)$_n$ exhibits a stable liquid-crystal phase based on the chromogen. The organic dye is soluble in water or in a water-soluble organic solvent such as acetone, alcohol, or dioxane. When, for example, a solution of solids concentration of 1 to 20% by weight of at least one kind of dye obtained in such a manner is applied by a suitable coating method using the action of shearing force such as a doctor blade method, an orienting process can be performed. The oriented solidified layer obtained thus exhibits a dichromatic polarizing function.

On the other hand, a suitable polymer exhibiting uniaxial orienting characteristic can be used as the liquid-crystal polymer containing the dichromatic dye and exhibiting a polarizing function. Incidentally, for example, the polymer maybe represented by the following formula (8) (Japanese Patent Publication No. 11-101964 and Japanese Patent Publication No. 11-160538).

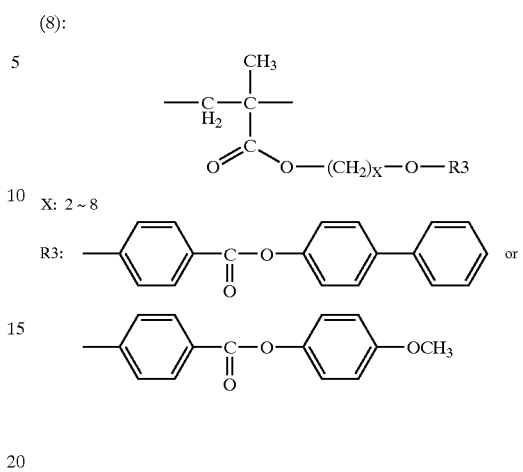

(8)

The liquid-crystal polymer may be obtained by polymerization of at least one of liquid-crystal monomers represented by the following formulae (A) to (D) on the basis of irradiation with ultraviolet rays.

(A):

$H_2C$=$\underset{H}{C}$—$\underset{O}{\overset{\parallel}{C}}$—O—⟨cyclohexyl⟩—⟨cyclohexyl⟩—C$n$H$2n+1$ n = 3~8

(B):

$H_2C$=$\underset{H}{C}$—$\underset{O}{\overset{\parallel}{C}}$—O—⟨phenyl⟩—⟨cyclohexyl⟩—C$n$H$2n+1$ n = 3~8

(C):

$H_2C$=$\underset{H}{C}$—$\underset{O}{\overset{\parallel}{C}}$—O—⟨phenyl⟩—C=C—⟨phenyl⟩—C$n$H$2n+1$ n = 3~8

(D):

$H_2C$=$\underset{H}{C}$—$\underset{O}{\overset{\parallel}{C}}$—O—⟨phenyl⟩—⟨phenyl⟩—CN On the other hand, a suitable dye can be used as the dichromatic dye to be contained in the liquid-crystal polymer layer without any particular limitation. From the point of view to obtain a polarizing layer excellent in heat resistance, dyes represented by the following formulae (9) to (11) may be preferably used.

(9):

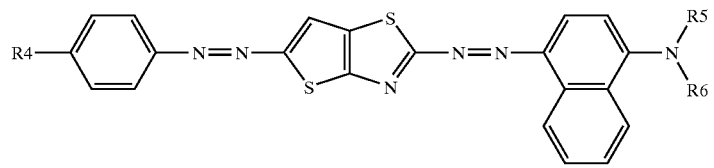

(10):

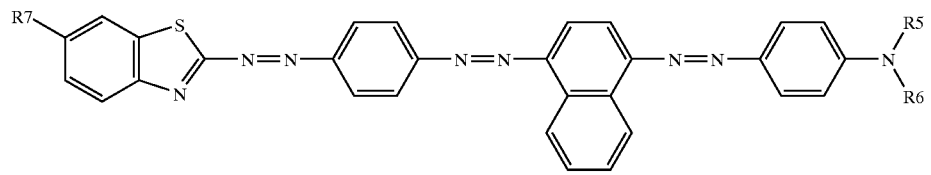

(11):

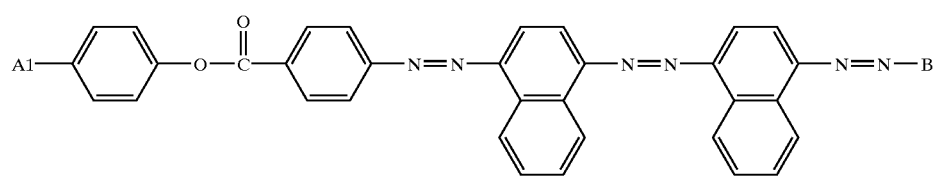

In the formulae (9) and (10), R4 is hydrogen, halogen, $C_nH_{2n+1}$, $COC_nH_{2n+1}$, $OCOC_nH_{2n+1}$, $COOC_nH_{2n+1}$ or $CH_2COOC_nH_{2n+1}$. Each of R5 and R6 is hydrogen or $C_nH_{2n+1}$. R6 may be one of radicals represented by the following formulae (E) and (F). Further, each of R5 and R6 may be represented by the following formula (G). On the other hand, R7 is halogen or $C_nH_{2n+1}$. Incidentally, n is an integer of from 1 to 8, and m is an integer of from 1 to 5.

(E):

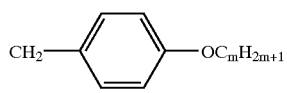

(F):

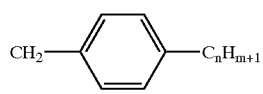

(G):

On the other hand, in the formula (11), Al is $C_nH_{2n+1}$ or a radical represented by the following formula in which n is an integer of from 1 to 8.

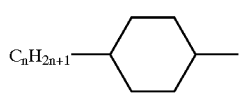

In the formula (11), B is one of radicals represented by the following formulae (H) to (K) in which R8 is $C_nH_{2n+1}$ or $C_nH_{2n}OCH_3$ in which n is an integer of from 1 to 8.

(H):

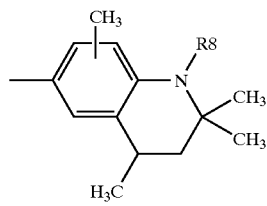

(I):

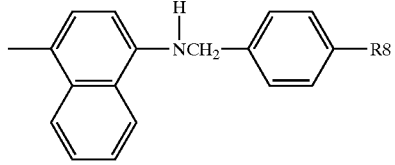

(J):

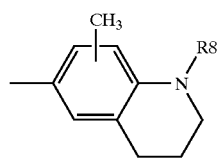

(K):

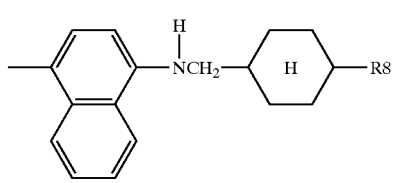

In the description, the formation of the polarizing layer can be performed, for example, by a method in which a dichromatic dye is mixed with a solution containing at least one kind of liquid-crystal polymer and the mixture solution is applied on an oriented film to thereby orient the liquid-crystal polymer uniaxially. A solvent is generally used for dissolving the liquid-crystal polymer to set the solids concentration of the liquid-crystal polymer to be in a range of from 1 to 20% by weight. When liquid-crystal monomer is polymerized by ultraviolet rays, however, the use of such a solvent may be avoided. As the dichromatic dye, at least one kind of dichromatic dye can be used in accordance with the wavelength region of polarizing characteristic. The amount of use of the dichromatic dye is generally in a range of from 1 to 20% by weight with respect to the weight of the liquid-crystal polymer or monomer.

An example of the liquid-crystal polymer containing the dichromatic dye and exhibiting a polarizing function is represented by the formula (12) (Nitto Technical Report Vol.35, No.1 (1997), pp79–82).

(12):

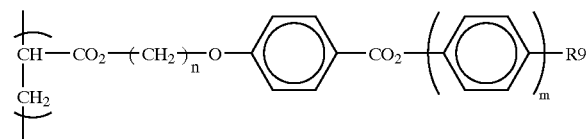

in which n is an integer of from 1 to 10, R9 is an alkoxy radical such as a cyano radical or a methoxy radical, and m is an integer of from 1 to 5.

On the other hand, the dichromatic dye-containing lyotropic substance can be provided in accordance with the lyotropic liquid-crystal dichromatic dye. When a solution of the dichromatic dye-containing lyotropic substance is applied, fluid orientation can be performed (WO97/39380 Publication) The dichromatic dye-containing lyotropic substance is available on the market from Russian Technology Group, etc.

The birefringent layer to be laminated on the polarizing layer is formed as a solid film of oriented liquid crystal or as a polymer layer containing oriented liquid crystal by using at least one of liquid-crystal polymer, polymerizable liquid crystal, liquid crystal or liquid crystal-containing polymer. The liquid-crystal compound used is not particularly limited. For example, any liquid-crystal compound may be used if a suitable liquid-crystal structure such as a nematic structure, a cholesteric structure, a twisted nematic structure or a discostic structure can be formed.

Incidentally, a specific example of the nematic liquid-crystal polymer is represented by the following formula (13).

(13):

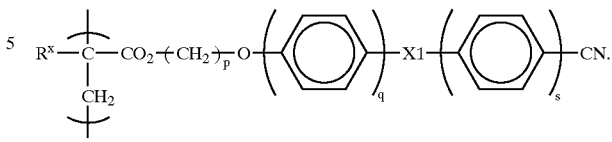

in which $R^x$ is methyl radical or hydrogen atom, p is an integer of from 1 to 6, X1 is $-CO_2-$ or $-OCO-$, and each of q and s is an integer of 1 or 2 satisfying q+s=3.

The birefringent layer made of the nematic liquid-crystal polymer may be oriented planarly horizontally or thicknesswise obliquely. In the case of thicknesswise oblique orientation, an orienting process may be performed by a method described in Japanese Patent Publication No. 12-327924, Japanese Patent Publication No. 12-327720 or Japanese Patent Publication No. 12-328063.

On the other hand, a specific example of the cholesteric liquid-crystal polymer is a copolymer of a monomer (Japanese Patent Publication No. 9-133810) containing liquid-crystal structured to have asymmetric carbon atoms in a molecule as represented by the following formula (14) and a nematic monomer represented by the following formula (13).

(14):

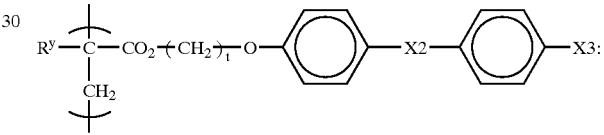

in which $R^Y$ is methyl radical or hydrogen atom, t is an integer of from 1 to 6, X2 is $-CO_2-$ or $-OCO-$, and X3 is $-COR^{10}$ or $R^{11}$ in which each of $R^{10}$ and $R^{11}$ is given as follows.

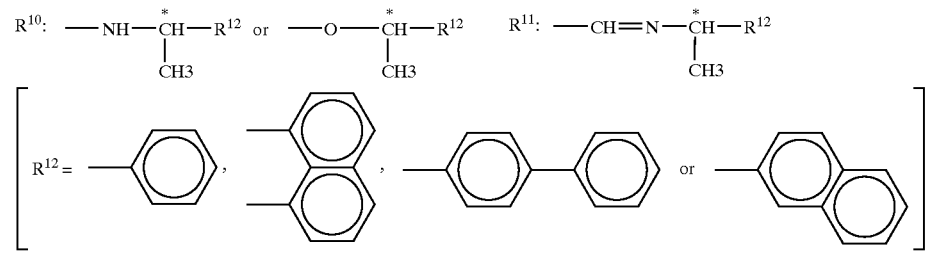

The birefringent layer made of the cholesteric liquid-crystal polymer may oriented in the Grandjean texture as it exhibits circular dichroism to light in a visible light region. As described in Japanese Patent Nos. 2972892 and 2813222, the birefringent layer may be provided so that the product of pitch and refractive index of a helical structure in the birefringent layer oriented in the Grandjean-texture is not larger than 400 nm or so that the helical axis is inclined.

Specific examples of the twisted nematic liquid crystal or polymer thereof include: liquid crystal nematically oriented at a twist angle of from 0 to 90 degrees as described in Japanese Patent Publication No.6-75114; and liquid crystal nematically oriented at a twist angle exceeding 90 degrees as described in Japanese Patent Publication No. 6-75115.

Hence, the birefringent layer made of twisted nematic liquid crystal or polymer thereof may be nematically oriented at a twist angle of from 0 to 360 degrees.

A specific example of the discotic liquid crystal or polymer thereof is polymerizable triphenylene discostic liquid crystal as used for forming WV film (tradename, made by Fuji Photo Film Co., Ltd.). Another example of the discotic liquid crystal is triphenylene liquid crystal represented by the following formula (15).

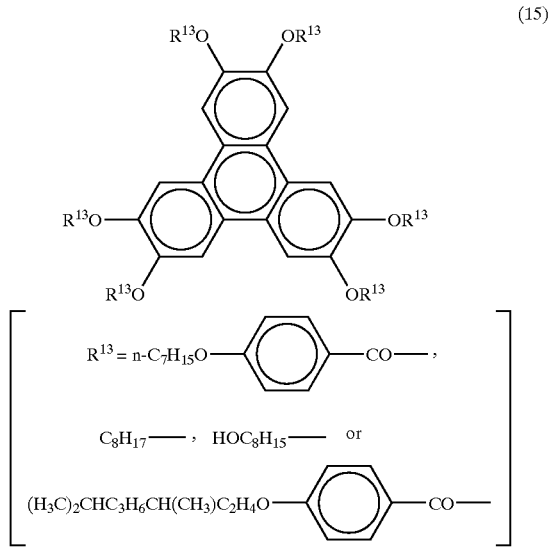

The birefringent layer made of the discotic liquid crystal or polymer thereof may be provided so that the disk-like compound as described above is oriented planarly horizontally or thicknesswise obliquely to form a state of orientation such as discotic nematic orientation or columnar orientation.

In the description, "horizontal orientation of liquid crystal" means that the direction of the highest refractive index of liquid-crystal molecules is parallel with the planar direction of a layer of a support substrate supporting the liquid-crystal layer. On the other hand, "oblique orientation" means other orientation than the horizontal orientation. Hence, "oblique orientation" includes a state in which the direction of the highest refractive index of liquid-crystal molecules is perpendicular to the thicknesswise direction in addition to a state which the direction of the highest refractive index of liquid-crystal molecules is inclined to the support layer. Incidentally, any suitable process can be used for orienting liquid crystal without particular limitation. For example, a film surface subjected to a drawing treatment, an oriented film subjected to a rubbing treatment, an optically oriented film based on irradiation with polarized ultraviolet rays, or a fluid-oriented process may be used.

The number of birefringent layers to be laminated on the polarizer may be one or two or more at option. When two or more layers are laminated, the birefringent layers to be laminated may be combined suitably. Incidentally, in the birefringent layer made of cholesteric liquid crystal oriented in the Grandjean texture to exhibit circular dichroism, the wavelength region exhibiting circular dichroism can be widened to a visible light region by combination of two layers or three or more layers which are provided to have different wavelength regions in accordance with the wavelength region exhibiting circular dichroism on the basis of the helical pitch.

The birefringent layer made of cholesteric liquid crystal exhibiting circular dichroism can function as a luminance-enhancing layer. In this case, the birefringent layer may be combined with a birefringent layer functioning as a quarter-wave plate so that circularly polarized light can be converted into linearly polarized light. As a result, the directions of polarization can be made coincident with each other, so that absorption loss owing to the polarizing layer can be prevented. Further, in this case, the birefringent layer may be combined with a birefringent layer functioning as a quarter-wave plate and with a birefringent layer functioning as another wave plate such as a half-wave plate so that the wavelength region giving the retardation of a quarter wavelength can be widened to a visible light region.

In addition, one birefringent layer or two or more birefringent layers functioning as optically compensating layers for compensating for the retardation caused by the birefringence of the liquid-crystal display panel to prevent coloring caused by the view angle change based on the retardation or to widen the viewing angle of good visibility to thereby improve display characteristic, can be combined and laminated. Incidentally, a birefringent layer including a discotic or nematic liquid-crystal polymer layer obliquely oriented may be advantageously used for widening the viewing angle.

Incidentally, the birefringent layer to be laminated on the polarizing layer can be formed as a self-supporting film in which the shape can be retained. In the polymer film of liquid-crystal polymer or of polymerizable liquid crystal can form a self-supporting solid film from itself. Liquid crystal such as nematic liquid crystal, cholesteric liquid crystal, twisted nematic liquid crystal or discotic liquid crystal is, however, fluid at room temperature, so that, in some case, a solid film is difficult to be formed. As a measure against this case, at least one kind of mesomorphic or non-mesomorphic polymer may be used so as to be formed as a birefringent layer having a liquid crystal-containing polymer layer as occasion demands. As a result, liquid crystal is held in the self-supporting film of the polymer, so that a film having the shape capable of being retained as a whole can be formed. The thickness of each of the birefringent layers formed can be determined suitably in accordance with the retardation which is a target. Generally, the thickness is set to be not larger than 300 $\mu$m, especially in a range of from 0.1 to 100 $\mu$m, further especially in a range of from 0.5 to 50 $\mu$m.

For the formation of the laminated optical device, a support film can be used in accordance with necessity to support closely the polarizing layer or/and the birefringent layer. Because the polarizing layer or the birefringent layer can be formed on the support film by an applying method such as a coating method, the use of the support film is advantageous from the point of view of reduction in thickness of the formed layer and production efficiency such as manufacturability. Further, it is preferable from the point of view of reduction in thickness and weight that the support film used is one sheet. The thickness of the support film can be determined suitably in accordance with strength. Generally, the thickness is set to be not larger than 300 $\mu$m, especially in a range of from 5 to 150 μm, further especially in a range of from 10 to 100 μm.

A film made of a suitable transparent polymer can be used as the support film without any particular limitation. Especially, there can be preferably used a material which is excellent in transparency, mechanical strength, thermal stability, and moisture sealability, and which is excellent in uniformity of thickness so that the retardation is as small as possible. Examples of the polymer include polycarbonate, polyallylate, polysulfone, polyolefin, cycloolefin polymer, polyester, norbornane resin, acrylic resin, polystyrene, cellulose resin, maleimide resin, polyamide, polyimide, polyether-sulfone, and denatured substance thereof.

When the support film is used, the polarizing and birefringent layers to be attached to the support film may be all disposed on one of opposite surfaces of the support film or may be disposed on the opposite surfaces of the support film separately in accordance with the functional difference or the like. Generally, the method in which the polarizing layer and the birefringent layer are provided on one of opposite surfaces of the support film is advantageous from the point of view of manufacturability. Incidentally, a suitable coating method such as a casting method, a spin coating method, a dipping method or a spraying method can be used for forming the polarizing layer and the birefringent layer by coating.

When the polarizing layer and the birefringent layer are to be formed by superposition, a surface serving as a lower layer may be covered with a transparent protective layer for the purposes of preventing mar which disturbs viewing, and preventing degradation, as occasion demands. The transparent protective layer can be formed out of a suitable material such as polymers which is listed in the description for the support film and which does not disturb optical functions. Especially, there can be preferably used a suitable crosslinkable resin which contains multifunctional monomer capable of being crosslinked three-dimensionally by irradiation with ultraviolet rays through a photocatalyst to thereby form a transparent hard film of an ultraviolet-curable resin such as an urethane-acrylic resin or an epoxy resin. The oriented film for orienting liquid crystal to form the birefringent layer may be provided to serve also as the transparent protective layer (cover layer) provided for mar-prevention, and so on. The thickness of the transparent protective layer can be determined suitably and is generally set to be not larger than 100 μm, especially not larger than 50 μm, more especially in a range of from 0.1 to 30 μm.

In the laminated optical device according to the invention, the birefringent layer exhibiting a luminance-enhancing function may be provided as described above or a luminance-enhancement film may be formed separately and laminated. Examples of the luminance-enhancement film include: a film reflecting linearly polarized light such as DBEF (tradename, made by 3M Company); a circular dichroic film reflecting circularly polarized light such as PCF (tradename, made by Nitto Denko Corp.); and a film transmitting linearly polarized light by scatter anisotropy such as DRPF (tradename, made by 3M Company). Each of these luminance-enhancing functional layers may be formed as the birefringent layer. A suitable adhesive agent such as a tackiness agent can be used for laminating the luminance-enhancement film. The adhesive layer is preferably as thin as possible.

An adhesive layer may be provided on one or each of the opposite outer surfaces of the laminated optical device for the purpose of bonding the laminated optical device to another member. A suitable transparent adhesive agent such as an acrylic adhesive agent, a silicone adhesive agent, a polyester adhesive agent, a polyurethane adhesive agent, a polyether adhesive agent, and a rubber adhesive agent may be used for forming the adhesive layer. Especially, it is preferable to use an acrylic adhesive agent superior in transparency, weather resistance, and heat resistance. Further, as the adhesive layer, it is preferably use an adhesive layer in which optical distortion due to heat shrinkage stress is hardly generated in the laminated optical device-forming layer so that the retardation is hardly generated when the laminated optical device is bonded to a liquid-crystal display panel through the adhesive layer and heated. Hence, it is possible to form a liquid-crystal display apparatus which is little in luminance mura and excellent in viewing angle with good visibility.

A specific example of the acrylic adhesive agent is an adhesive agent containing an acrylic polymer with a weight average molecular weight of not lower than 100,000 as a base polymer, the acrylic polymer being prepared by copolymerization of a combination of (meth)acrylic alkyl ester containing an alkyl radical having 20 or less carbon atoms, such as a methyl radical, an ethyl radical, or a butyl radical, and an acrylic monomer constituted by a modified component of (meth) acrylic acid, (meth) acrylic acid hydroxyethyl, or the like, with the glass transition temperature not higher than 0° C. However, the acrylic adhesive agent is not limited to this example. The adhesive layer in which the optical distortion is hardly generated can be achieved by adjustment of an elastic modulus, or the like.

The adhesive layer can be attached to the laminated optical device by a suitable method. Examples of the method include: a method of attaching an adhesive agent solution directly onto a laminated optical device by a suitable development method such as a casting method or a coating method, after dissolving or dispersing an adhesive agent component in a suitable solvent to prepare the adhesive agent solution; and a method of transferring an adhesive layer onto a laminated optical device after forming the adhesive layer on a separator in accordance with the description described above. The adhesive layer provided may be constituted by a superposed layer of different compositions or different kinds of adhesive layers.

The thickness of the adhesive layer provided on the laminated optical device can be determined suitably in accordance with adhesive force and is generally set to be in a range of from 1 to 500 μm, especially in a range of from 5 to 100 μm. The adhesive layer may contain suitable additives such as a filler, and an anti-oxidant constituted by natural or synthetic resins, glass fiber, and glass beads, as occasion demands. The adhesive layer may also contain fine particles so that the adhesive layer exhibits light-diffusing characteristic. Incidentally, as shown in FIG. 1, a separator 51 is preferably bonded onto the exposed surface of the adhesive layer 5 so that the tack layer 5 can be protected from contamination, before the tack layer 5 is put into practical use.

The laminated optical device according to the invention can be preferably used for the formation of a liquid-crystal display apparatus, or the like. In this case, the birefringent layer and the polarizing layer are integrally laminated on each other in advance. Hence, there is an advantage that variation in quality owing to displacement of the optical axis is hardly generated so that efficiency in assembling the liquid-crystal display apparatus is excellent. For the formation of the liquid-crystal display apparatus, the laminated optical device may be disposed on one or each of opposite surfaces of the liquid-crystal display panel. In this case, either of the birefringent layer and the polarizing layer may be provided on the liquid-crystal display panel side. An arrangement structure in which the optically compensating birefringent layer is located between the polarizing layer and the liquid-crystal display panel is generally preferred from the point of view of the compensating effect. Incidentally, the liquid-crystal display panel applied is optionally selected from a TN type panel, an STN type panel, a TFT type panel, a ferroelectric liquid-crystal type panel, and so on.

EXAMPLE 1

One of opposite surfaces of a 50 μm-thick triacetyl cellulose (TAC) film (T-50SH made by Fuji Photo Film Co., Ltd.) was coated with a dichromatic dye-containing lyotropic liquid-crystal aqueous solution (LC Polarizer with a solids concentration of 16.7% by weight, made by Optiva Corp.) by wire bar (No.5). Then, the solution was dried at 40° C. to form a 1.8 μm-thick polarizing layer on the TAC film. The TAC film with the polarizing layer was immersed in an aqueous solution containing 30% by weight of calcium chloride. The TAC film with the polarizing layer was washed with pure water and then dried at 40° C. Thus, the TAC film with the polarizing layer was made water-insoluble.

Then, the polarizing layer was spin-coated with polyvinyl alcohol. The surface of the polarizing layer was rubbed with rayon cloth at an azimuth angle of 17.5 degrees with respect to an axis of polarization to form a 0.1 μm-thick oriented film. Then, a tetrachloroethane solution of a nematic liquid-crystal polymer with a weight average molecular weight of about 5,000 represented by the following formula (16) was applied on the oriented film. The solution was heated at 120° C. and oriented to form a 2.2 μm-thick birefringent layer serving as a half-wave plate to monochromatic light. A 0.1 μm-thick oriented film rubbed at an azimuth angle of 80 degrees with respect to the axis of polarization in the same manner as described above was formed on the birefringent layer. The tetrachloroethane solution of the nematic liquid-crystal polymer was applied on the oriented film. The solution was heated at 120° C. and oriented to form a 1.1 μm-thick birefringent layer serving as a quarter-wave plate to monochromatic light.

(16)

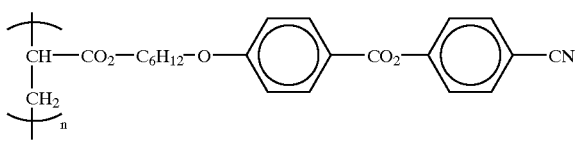

Then, a 0.1 μm-thick oriented film constituted by a rubbed layer of polyvinyl alcohol was formed on the surface side birefringent layer in the same manner as described above.

Then, a mixture of cholesteric liquid-crystal polymers with a weight average molecular weight of from about 7,000 to about 10,000 in different rates of copolymerization between nematic monomer and cholesteric monomer each represented by the following formulae (17) and (18) was repeatedly applied on the oriented layer to form a multilayer structure. The multilayer structure was heated at 150° C. and oriented in the Grandjean texture to form an about 5 μm-thick birefringent layer exhibiting circular dichroism in a wavelength range of from 410 to 690 nm. Then, an acrylic adhesive layer was formed on the exposed surface of the TAC film. Thus, a laminated optical device with a total thickness of about 80 μm was obtained. The laminated optical device exhibited a polarizing function and a good luminance-enhancing function.

(17)

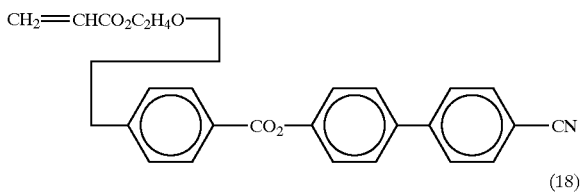

(18)

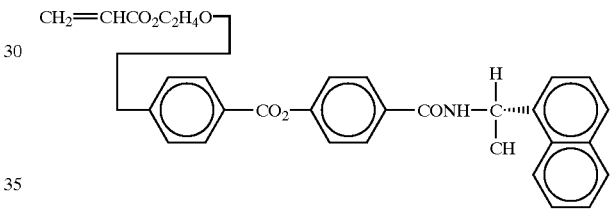

EXAMPLE 2

A 0.1 μm-thick oriented film was formed on one of opposite surfaces of a 100 μm-thick norbornane film (ARTON casting film made by JSR Corp.) in the same manner as in Example 1. The oriented film was spin-coated with a tetrachloroethane solution containing 20% by weight of nematic liquid-crystal polymer represented by the formula (16) and 2% by weight of dichromatic dye (1:2:4 mixture of G-202, G-207 and G-429, made by NIPPON KANKOH SHIKISO KENKYUSHO). The solution was heated at 120° C. and oriented to form a 2 μm-thick polarizing layer.

Then, a 0.1 μm-thick oriented film rubbed in parallel with an axis of absorption of the polarizing layer was formed on the polarizing layer in the same manner as described above. The oriented film was spin-coated with a tetrachloroethane solution containing 10% by weight of triphenylene discotic liquid-crystal liquid represented by the following formula (19). The solution was heated at 200° C. and oriented to form a 2 μm-thick birefringent layer oriented obliquely,

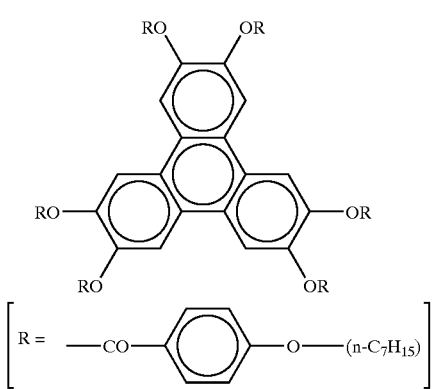

(19)

Then, a 0.1 μm-thick oriented film rubbed in parallel with the axis of absorption of the polarizing layer in the same manner as described above was formed on the birefringent layer. The oriented layer was spin-coated with a tetrachloroethane solution containing 10% by weight of a mixture of a diacrylic compound and a nematic liquid-crystal polymer prepared by copolymerization of nematic monomer represented by the formula (17) and nematic monomer represented by the following formula (20). The solution was heated at 140° C. and oriented to form a 2 μm-thick birefringent layer oriented obliquely.

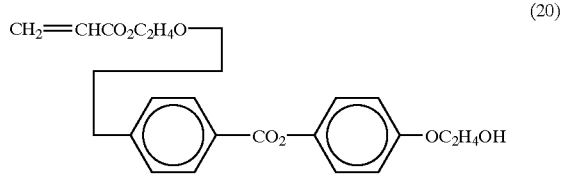

(20)

Then, a 0.1 μm-thick oriented film rubbed in parallel with the axis of absorption of the polarizing layer in the same manner as described above was formed on the surface side birefringent layer. A cholesteric liquid-crystal polymer prepared by copolymerization of monomers represented by the formulae (17) and (18) was applied on the oriented film. The polymer was heated at 140° C. and oriented in the Grandjean texture to form a 2 μm-thick birefringent layer having circular dichroism in which the product of pitch and refractive index in the helical structure was 330 nm. Then, an acrylic adhesive layer was formed on the birefringent layer. A 140 μm-thick DBEF (made by 3M Company) was bonded and laminated on the exposed surface of the norbornane film through the acrylic adhesive layer. Thus, a laminated optical device with a total thickness of about 290 μm was obtained. The laminated optical device exhibited good optical properties such as a polarizing function, a luminance-enhancing function and an optically compensating function for widening the viewing angle.

COMPARATIVE EXAMPLE 1

An 80 μm-thick half-wave plate (NRF-R270 made by Nitto Denko Corp.) of a drawn film, an 80 μm-thick quarter-wave plate (NRF-R140 made by Nitto Denko Corp.) of a drawn film and a 50 μm-thick TAC film were laminated successively on one of opposite surfaces of a 240 μm-thick polarizer (NPF-HEG1425DU made by Nitto Denko Corp.) through acrylic adhesive layers. A birefringent layer exhibiting circular dichroism in a wavelength range of from 410 to 690 nm was formed on the TAC film in the same manner as in Example 1. An acrylic adhesive layer was formed on the exposed surface of the polarizer. Thus, a laminated optical device was obtained. The total thickness of the laminated optical device was 500 μm.

COMPARATIVE EXAMPLE 2

A 102 μm-thick WV film (WV A01 A made by Fuji Photo Film Co., Ltd.) and an 82 μm-thick NH film (made by Nippon Petrochemicals Co., Ltd.) were laminated successively on one of opposite surfaces of a 240 μm-thick polarizer (NPH-HEG1425DU) through acrylic adhesive layers. An acrylic adhesive layer was formed on the exposed surface of the polarizer. Thus, a laminated optical device was obtained. The total thickness of the laminated optical device was 630 μm.

Although the invention has been described in its preferred formed with a certain degree of particularity, it is understood that the present disclosure of the preferred form can be changed in the details of construction and in the combination and arrangement of parts without departing from the spirit and the scope of the invention as hereinafter claimed.

What is claimed is:

1. A laminated optical device comprising:
   a polarizing layer formed by coating and having a thickness of not larger than 5 μm; and
   at least one birefringent layer laminated on said polarizing layer by coating and having a thickness of not larger than 50 μm, wherein said birefringent layer includes either a solid film of oriented liquid crystal or a polymer layer containing oriented liquid crystal.

2. A laminated optical device according to claim 1, wherein said polarizing layer is made of one member selected from the group consisting of a lyotropic liquid-crystal dichromatic dye, a dichromatic dye-containing liquid-crystal polymer and a dichromatic dye-containing lyotropic substance.

3. A laminated optical device according to claim 1, wherein said birefringent layer contains one member selected from the group consisting of discotic or nematic liquid crystal oriented planarly horizontally or thicknesswise obliquely, cholesteric liquid crystal oriented in a Grandjean texture, and liquid crystal nematically oriented at an angle of twist of from 0 to 360 degrees.

4. A laminated optical device according to claim 1, wherein said polarizing layer and said birefringent layer are superposed closely on each other through an oriented film.

5. A laminated optical device according to claim 1, further comprising a luminance-enhancement film laminated.

6. A laminated optical device according to claim 1, said laminated optical device having two opposite surfaces, further comprising at least one adhesive layer disposed on one or each of the opposite surfaces.

7. A liquid-crystal display apparatus comprising:
   a liquid-crystal display panel; and
   at least one laminated optical device defined in claim 1 and disposed on one of opposite surfaces of said liquid-crystal display panel.

8. A laminated optical device according to claim 1, wherein said birefringent layer contains a discotic or nematic liquid crystal oriented planarly horizontally or thicknesswise obliquely.

9. A laminated optical device according to claim 1, wherein said birefringent layer contains a cholesteric liquid crystal oriented in a Grandjean texture.

10. A laminated optical device according to claim 1, wherein said birefringent layer contains a liquid crystal nematically oriented at an angle of twist of from 0 to 360 degrees.

11. A laminated optical device according to claim 1, wherein said polarizing layer has a thickness of from 0.1 to 4 μm.

12. A laminated optical device according to claim 1, wherein said polarizing layer has a thickness of from 0.2 to 3 μm.

13. A laminated optical device comprising:

a polarizing layer having a thickness of not larger than 5 μm; and at least one birefringent layer laminated on said polarizing layer and including either a solid film of oriented liquid crystal or a polymer layer containing oriented liquid crystal, wherein said birefringent layer is coated directly on said polarizing layer.

14. A liquid-crystal display apparatus comprising:

a liquid-crystal display panel; and at least one laminated optical device defined in claim 13 and disposed on one of opposite surfaces of said liquid-crystal display panel.

* * * * *